(12) United States Patent
Naruoka et al.

(10) Patent No.: US 9,982,592 B2
(45) Date of Patent: May 29, 2018

(54) SUPERCHARGER EQUIPPED ENGINE

(71) Applicant: Kawasaki Jukogyo Kabushiki Kaisha, Hyogo (JP)

(72) Inventors: Shohei Naruoka, Kakogawa (JP); Yoshiharu Matsuda, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 552 days.

(21) Appl. No.: 14/643,945

(22) Filed: Mar. 10, 2015

(65) Prior Publication Data

US 2015/0184585 A1  Jul. 2, 2015

Related U.S. Application Data

(63) Continuation of application No. PCT/JP2013/071850, filed on Aug. 13, 2013.

(30) Foreign Application Priority Data

Sep. 13, 2012  (JP) .................. 2012-201407

(51) Int. Cl.
  *F02B 39/04* (2006.01)
  *F02B 33/40* (2006.01)
  (Continued)

(52) U.S. Cl.
  CPC ............. *F02B 39/04* (2013.01); *F02B 33/40* (2013.01); *F02N 11/00* (2013.01); *F02N 15/023* (2013.01);
  (Continued)

(58) Field of Classification Search
  CPC .......... F02B 39/04; F02B 33/40; F02B 61/02; F16F 15/264; F16F 2230/0011; F02N 15/10; F02N 15/023; F02N 11/00
  See application file for complete search history.

(56) References Cited

U.S. PATENT DOCUMENTS 6,820,577 B2  11/2004  Yamada
6,832,590 B2  12/2004  Hattori et al.
(Continued)

FOREIGN PATENT DOCUMENTS

CN  102575572  7/2012
CN  102656082  9/2012
(Continued)

OTHER PUBLICATIONS

Notification of Reason(s) for rejection dated Feb. 23, 2016 for Japan Patent Application No. 2014-535460 with English Language Summary (4 pages).
(Continued)

*Primary Examiner* — Jason Newton

(57) ABSTRACT

A supercharger-equipped combustion engine includes a crankcase supporting a crankshaft extending in a widthwise direction of a vehicle, and a cylinder block disposed above the crankcase. A supercharger is disposed above the crankcase and rearward of the cylinder block and driven by power of the crankshaft. The power of the crankshaft is transmitted to the supercharger through a counter shaft which rotatably supports a counter gear. The counter shaft extends parallel with the crankshaft, and a starter gear is arranged on the counter shaft so as to be aligned in the widthwise direction. The counter shaft is disposed rearward of the crankshaft, and the supercharger is disposed rearward of the counter shaft. A starter motor meshing with the starter gear is disposed frontward of the supercharger.

8 Claims, 9 Drawing Sheets

(51) Int. Cl.
  *F02N 11/00* (2006.01)
  *F02N 15/02* (2006.01)
  *F02N 15/10* (2006.01)
  *F16F 15/26* (2006.01)
  *F02B 61/02* (2006.01)

(52) U.S. Cl.
  CPC ............ *F02N 15/10* (2013.01); *F16F 15/264* (2013.01); *F02B 61/02* (2013.01); *F16F 2230/0011* (2013.01)

(56) References Cited

U.S. PATENT DOCUMENTS

| | | | |
|---|---|---|---|
| 8,091,534 | B2 | 1/2012 | Mineo |
| 8,584,783 | B2 | 11/2013 | Saeki et al. |
| 8,707,931 | B2 | 4/2014 | Arima et al. |
| 2003/0217724 | A1 | 11/2003 | Hattori et al. |
| 2004/0134452 | A1 | 7/2004 | Yamada |
| 2007/0079796 | A1 | 4/2007 | Mineo |
| 2009/0229582 | A1* | 9/2009 | Sakuyama ............... B62M 7/06 123/559.1 |
| 2012/0186565 | A1 | 7/2012 | Arima et al. |
| 2012/0192839 | A1* | 8/2012 | Arima .................... F02B 33/32 123/559.1 |
| 2012/0267182 | A1* | 10/2012 | Saeki .................... B62K 19/30 180/219 |

FOREIGN PATENT DOCUMENTS

| | | |
|---|---|---|
| EP | 2489849 | 8/2012 |
| JP | 63-130491 | 6/1988 |
| JP | 02-006289 | 1/1990 |
| JP | 02-070920 | 3/1990 |
| JP | 02-264117 | 10/1990 |
| JP | 08-144774 | 6/1996 |
| JP | 09-088620 | 3/1997 |
| JP | 2001-001978 | 1/2001 |
| JP | 2003-193855 | 7/2003 |
| JP | 2004-150286 | 5/2004 |
| JP | 2007-085284 | 4/2007 |
| WO | 2011/046096 | 4/2011 |
| WO | WO2011/077898 | 6/2011 |

OTHER PUBLICATIONS

Communication pursuant to Article 94(3) EPC dated Apr. 6, 2017 for Corresponding European Patent Application No. 13836632.3 (4 pages).
PCT Application No. PCT/JP2013/071850 International Preliminary Report on Patentability dated Mar. 26, 2015, 5 pages.
Second Office Action dated Feb. 16, 2017 for Corresponding Chinese Patent Application No. 201380046307.9 with English language translation of the Search Report (7 pages).
First Office Action dated Jun. 30, 2016 for Corresponding Chinese Patent Application No. 201380046307.9 with partial English Language Translation (7 pages).
Extended and Supplementary Search Report dated Jun. 27, 2016 for Corresponding European Patent Application No. 13836632.3 (7 pages).
Summons to Attend Oral Proceedings Pursuan to Rule 115(1) EPC Issued Jan. 10, 2018 for Corresponding European Patent Application No. 13836632.3 (4 pages).

\* cited by examiner ical engine which is mounted on a vehicle, in which
a supercharger, that has a rotation axis extending in a
widthwise direction of the vehicle, compresses or pressur-
izes intake air and then supplies it to the combustion engine.

Description of Related Art

As a combustion engine mounted on a vehicle such as a
motorcycle, there is a combustion engine which includes a
supercharger driven by power from an engine rotary shaft, in
which the supercharger pressurizes intake air and then
supplies it to the combustion engine (e.g., Patent Document
1). Since the intake efficiency is increased by the use of the
supercharger, output of the combustion engine improves. In
the supercharger of Patent Document 1, power is transmitted
to a drive shaft of the supercharger through an idler gear
provided on an idler shaft which rotates in conjunction with
the engine rotary shaft.

RELATED DOCUMENT

Patent Document

[Patent Document 1] WO2011/046096

SUMMARY OF THE INVENTION

Meanwhile, in the combustion engine of the motorcycle,
gears such as a balancer gear and a starter driving gear are
disposed within a limited space in addition to the super-
charger, and it is necessary to ensure a space for installing
them. In Patent Document 1, in addition to the idler gear, a
starter driving gear is provided on the idler shaft, thereby
reducing the number of components and achieving space
saving. However, in Patent Document 1, the supercharger
and a starter driving motor are aligned in the axial direction
of the engine rotary shaft extending in the widthwise direc-
tion of the motorcycle, and thus the dimension of the
combustion engine in the widthwise direction of the motor-
cycle is increased.

The present invention has been made in view of the above
problem, and an object of the present invention is to provide
a supercharger-equipped combustion engine which allows a
dimension of the combustion engine in a widthwise direc-
tion of a vehicle to be reduced while reducing the number of
components.

In order to achieve the above object, a supercharger-
equipped combustion engine of the present invention is
mounted on a vehicle, and includes: a crankcase supporting
an engine rotary shaft; a cylinder block disposed above the
crankcase; a supercharger having a rotation axis extending
in a widthwise direction of the vehicle and configured to
pressurize intake air and supply it to the combustion engine;
an idler gear configured to transmit power of the engine
rotary shaft to the supercharger; and an idler shaft rotatably
supporting the idler gear, in which the idler shaft is disposed
rearward of the engine rotary shaft and extends parallel with
the engine rotary shaft. The supercharger is disposed above
the crankcase and rearward of the cylinder block and is
driven by the power of the engine rotary shaft. In such case,
other gear other than the idler gear is disposed on the idler
shaft so as to be aligned with the idler gear in the widthwise
direction of the vehicle, the supercharger is disposed rear-
ward of the idler shaft, and a component meshing with the
other gear is disposed forwardly of the supercharger. The
other gear other than the idler gear is, for example, a
balancer gear or a starter gear. Here, the idler gear simply
may be rotatably supported by the idler shaft, and both a case
where the idler gear rotates together with the idler shaft and
a case where the idler gear rotates relative to the idler shaft
are included.

According to this configuration, since the other gear other
than the idler gear is disposed on the idler shaft so as to be
aligned with the idler gear in the widthwise direction of the
vehicle, a dedicated shaft for the other gear is not necessary,
and therefore, it is possible to reduce the number of com-
ponents. Furthermore, since the supercharger is disposed
rearward of the idler shaft and the component meshing with
the other gear is disposed frontward of the supercharger, it
is possible to install the component meshing with the other
gear, in an empty space between the supercharger and the
idler shaft in the front-rear direction. As a result, it is
possible to prevent an increase in the dimension of the
combustion engine in the widthwise direction of the vehicle.

In the present invention, the other gear is preferably
disposed inward of the idler gear in the widthwise direction
of the vehicle. According to this configuration, since the
idler gear is located at the outer side in the widthwise
direction of the vehicle, accessing from the outer side in the
widthwise direction of the vehicle and mounting or dis-
mounting the supercharger are not disturbed by the other
gear, and therefore, it is possible to easily mount and
dismount the supercharger.

In the present invention, preferably, the supercharger-
equipped combustion engine further includes a supercharger
transmission configured to change a speed of power of the
engine rotary shaft and transmit the power to the super-
charger, the supercharger transmission includes an output
gear configured to change a speed of rotation of the idler
gear and output the rotation, rotary shafts for the idler gear
and the output gear extend parallel with the engine rotary
shaft, a rotary shaft of the supercharger and the rotary shaft
for the output gear of the supercharger transmission are
aligned in an up-down direction perpendicular to the width-
wise direction of the vehicle, and the supercharger-equipped
combustion engine further comprises a transmission body
configured to transmit power from the rotary shaft for the
output gear of the supercharger transmission to the rotary
shaft of the supercharger. According to this configuration,
since the rotary shaft of the supercharger and the rotary shaft
for the output gear of the supercharger transmission are
aligned in the up-down direction perpendicular to the width-
wise direction of the vehicle, it is possible to prevent an
increase in the dimension in the widthwise direction of the
vehicle as compared to the case where these rotary shafts are
aligned in the right-left direction.

In the present invention, preferably, the supercharger is
disposed above a rear portion of the crankcase, and an intake
air chamber is disposed between a discharge port of the
supercharger and an intake port of the combustion engine in a front-rear direction. According to this configuration, since the supercharger is disposed above the rear portion of the crankcase, the distance between the discharge port of the supercharger and the intake port of the combustion engine in the front-rear direction becomes long. As a result, the dimension of the intake air chamber in the front-rear direction can be increased, and therefore, it is possible to ensure a chamber capacity without increasing the dimension of the intake air chamber in the up-down direction. In addition, since an increase in the dimension of the intake air chamber in the up-down direction is suppressed, it is easy to install a component to be connected to the other gear.

Any combination of at least two constructions, disclosed in the appended claims and/or the specification and/or the accompanying drawings should be construed as included within the scope of the present invention. In particular, any combination of two or more of the appended claims should be equally construed as included within the scope of the present invention.

BRIEF DESCRIPTION OF THE DRAWINGS

In any event, the present invention will become more clearly understood from the following description of preferred embodiments thereof, when taken in conjunction with the accompanying drawings. However, the embodiments and the drawings are given only for the purpose of illustration and explanation, and are not to be taken as limiting the scope of the present invention in any way whatsoever, which scope is to be determined by the appended claims. In the accompanying drawings, like reference numerals are used to denote like parts throughout the several views, and:

DESCRIPTION OF EMBODIMENTS

A preferred embodiment of the present invention will now be described with reference to the accompanying drawings. The terms "left side" and "right side" used in the description in this specification are the left side and the right side relative to a driver maneuvering a vehicle to travel forwards.

Figure 1:
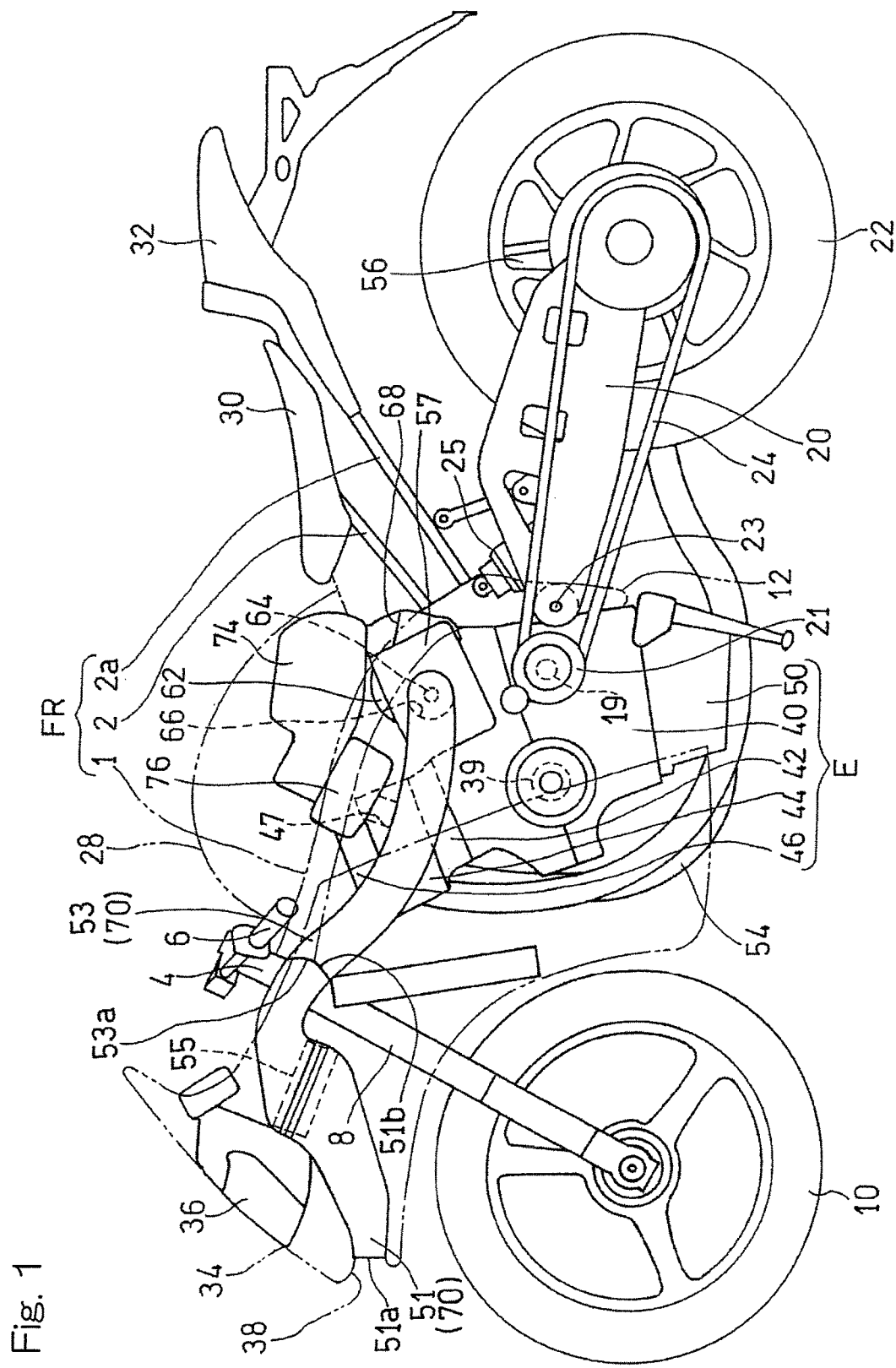
FIG. 1 is a left side view showing a motorcycle equipped with a supercharger-equipped combustion engine according to a first embodiment of the present invention.

FIG. 1 is a side view of a motorcycle equipped with a supercharger-equipped combustion engine according to an embodiment of the present invention. A motorcycle frame structure FR for the motorcycle includes a main frame 1 which forms a front half of the motorcycle frame structure FR, and a seat rail 2 and a reinforcement rail 2a which are mounted on a rear portion of the main frame 1 and form a rear half of the motorcycle frame structure FR. A front fork 8 is rotatably supported by a head pipe 4 integrally formed at a front end of the main frame 1, through a steering shaft (not shown). A front wheel 10 is fitted to the front fork 8. That is, the head pipe 4 serves as a handle stem, and the main frame 1, which is part of the motorcycle frame structure FR, extends from the head pipe 4 in the rearward direction of the motorcycle. A steering handle 6 is fixed to an upper end portion of the front fork 8.

Meanwhile, a swingarm bracket 12 is provided at a rear end portion of the main frame 1 which is a lower intermediate portion of the motorcycle frame structure FR. A swingarm 20 is supported by the swingarm bracket 12 for swing movement in the up-down direction, and a rear wheel 22 is supported by a rear end portion of the swingarm 20 so as to be rotatable about a pivot shaft 23.

A combustion engine E is fitted to the lower intermediate portion of the motorcycle frame structure FR and at the front side of the swingarm bracket 12. The speed of rotation of the combustion engine E is changed by a driving reduction gear mechanism or a driving speed-reduction mechanism 21, then the rotation is transmitted to a transmission mechanism 24 such as a chain, and the rear wheel 22 is driven through the transmission mechanism 24. The combustion engine E is, for example, a four-cylinder four-cycle type parallel multi-cylinder engine. The type of the combustion engine E is not limited thereto. A rear cushioning mechanism 25 is connected between the seat rail 2 and the swingarm 20. The rear cushioning mechanism 25 cushions a load applied between the rear wheel 22 and the seat rail 2.

A fuel tank 28 is disposed on an upper portion of the main frame 1, and a rider's seat 30 and a passenger's seat 32 are supported by the seat rail 2. In addition, a fairing 34 made of a resinous material is mounted on a front portion of the motorcycle so as to cover a portion from front of the head pipe 4 to sides of the front portion of the motorcycle (an upper half of the front portion). A headlamp unit 36 is mounted on the fairing 34. An air inlet 38 through which intake air is introduced from the outside to the combustion engine E is formed below the headlamp unit 36.

The combustion engine E includes: an engine rotary shaft 39 which extends in the widthwise direction of the motorcycle; a crankcase 40 which supports the engine rotary shaft 39; a cylinder block 42 which projects upward from the crankcase 40; a cylinder head 44 above the cylinder block 42; and an oil pan 50 provided below the crankcase 40. A rear portion of the crankcase 40 serves as a transmission case which houses the driving reduction gear mechanism 21. The cylinder head 44 is slightly inclined frontward, and four exhaust pipes 54 are connected to exhaust ports in a front surface of the cylinder head 44. The four exhaust pipes 54 are merged together at a location beneath the combustion engine E, and are connected to an exhaust muffler 56 disposed at the right side of the rear wheel 22.

A supercharger 62 is disposed rearward of the cylinder block 42 and above the crankcase 40. The supercharger 62 pressurizes or compresses cleaned air from an air cleaner 55 and supplies the cleaned air to the combustion engine E. The air cleaner 55 is disposed in the front portion of the motorcycle and cleans outside air. The supercharger 62 includes a supercharger rotary shaft 64 which extends in the widthwise direction of the motorcycle, a suction port 66 (FIG. 2) opened leftward, and a discharge port 68 opened upward.

The suction port 66 (FIG. 2) is located above the crankcase 40 and in a center portion of the combustion engine E in a widthwise direction. The discharge port 68 is located in the center portion of the combustion engine E in the widthwise direction of the motorcycle and rearward of an axis 64C of the supercharger rotary shaft 64. The suction port 66 of the supercharger 62 is located inward of a left side surface of the combustion engine E in the widthwise direction of the motorcycle. An intake duct 70 which introduces outside air to the supercharger 62 is connected to the suction port 66 from the outer side in the widthwise direction of the motorcycle.

Figure 3:
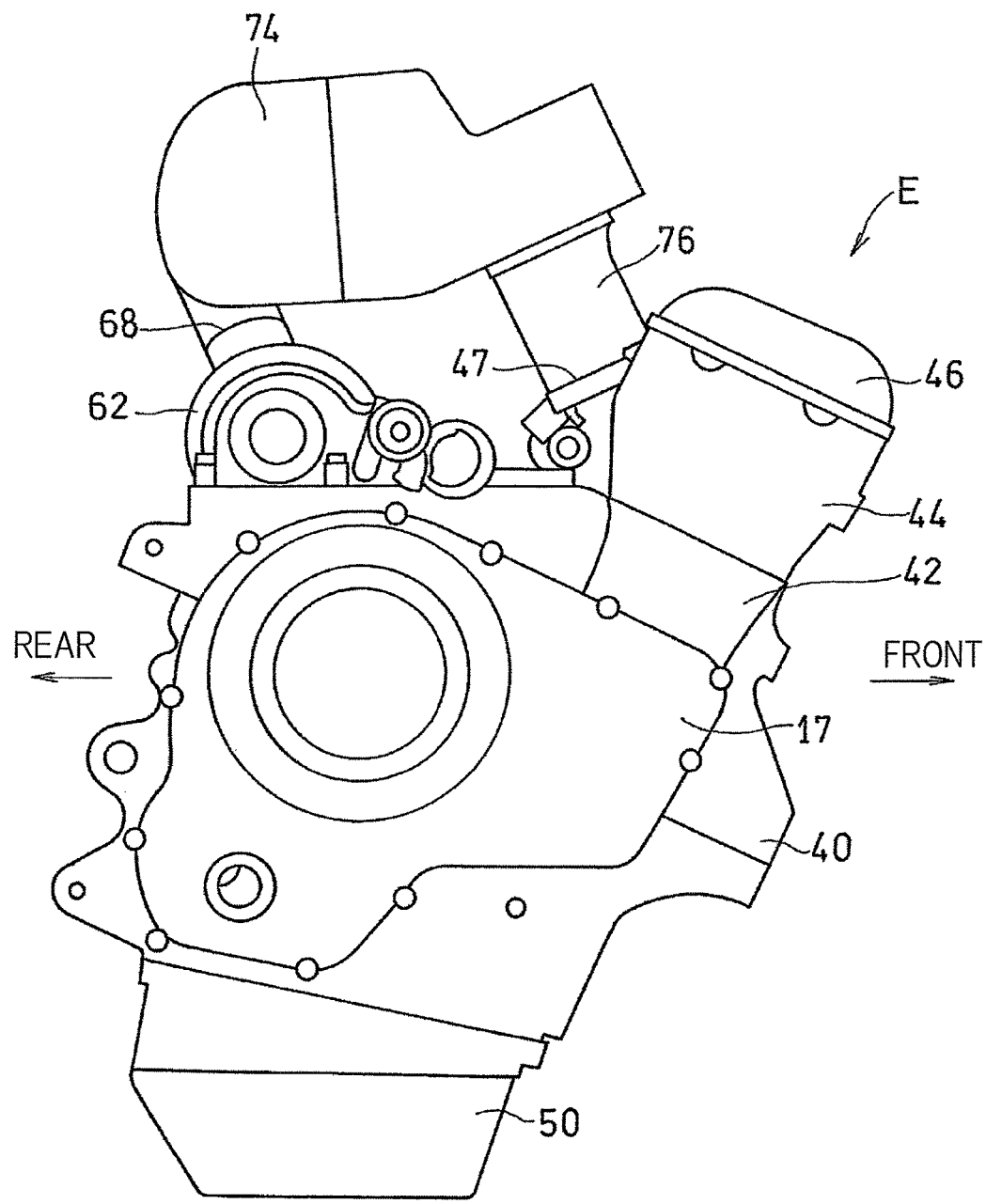
FIG. 3 is a right side view showing the combustion engine.
Figure 4:
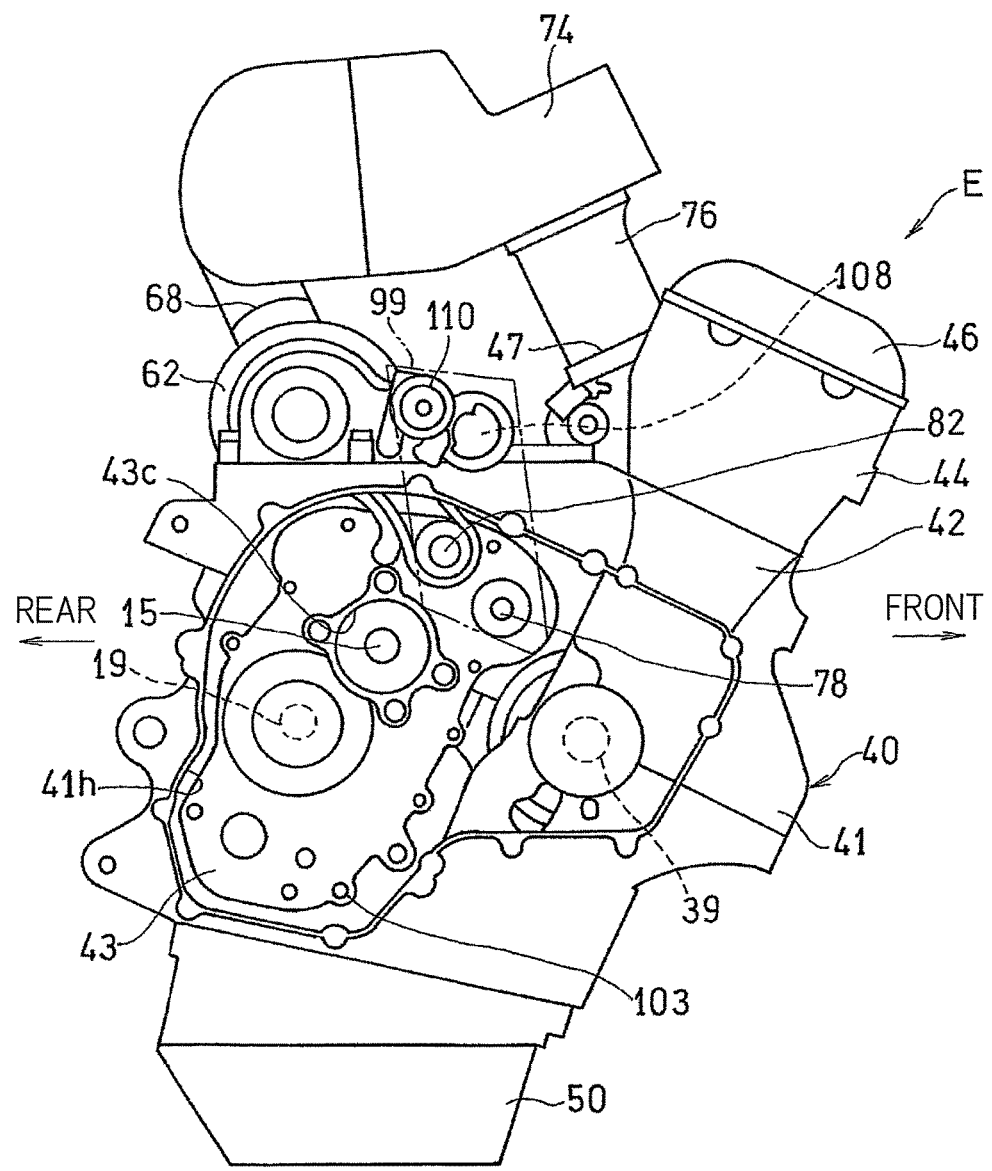
FIG. 4 is a right side view of the combustion engine, showing a state where a clutch cover is removed from FIG. 3.

FIG. 3 is a right side view of the combustion engine E, and FIG. 4 shows a state where a clutch cover 17 is removed from FIG. 3. As shown in FIG. 4, the crankcase 40 includes a crankcase body 41 and a holder 43 which is detachably mounted on the crankcase body 41 by means of a plurality of bolts 103. The crankcase body 41 has an opening 41h opened at the right side which is one side in the widthwise direction of the motorcycle. The holder 43 covers at least a part of the opening 41h from the right side.

The holder 43 supports right end portions of a driving reduction gear mechanism input shaft 15, a counter shaft 78, and a supercharger drive shaft 82, and the details thereof will be described later. The opening 41h of the crankcase body 41 is closed by the clutch cover 17 which is detachably mounted on the crankcase body 41 in FIG. 3.

The holder 43 in FIG. 4 also forms a part of a so-called cassette transmission structure. The holder 43 is formed such that the driving reduction gear mechanism input shaft 15, a driving reduction gear mechanism output shaft 19, and a shift mechanism (not shown) can be drawn out together to the side (right side) opposite to the chain 24 (FIG. 1). That is, the holder 43 is disposed at the right side which is the side opposite to the chain 24 (FIG. 1).

As shown in FIG. 1, the intake duct 70 is disposed at the left side which is one side of the combustion engine E, and includes a ram duct unit 51 at an upstream side and a suction duct portion 53 at a downstream side. The ram duct unit 51 is supported by the head pipe 4 such that a front end opening 51a thereof faces the air inlet 38 of the fairing 34, and increases the pressure of air introduced through the front end opening 51a, by a ram effect. A front end portion 53a of the suction duct portion 53 is connected to a rear end portion 51b of the ram duct unit 51.

Figure 2:
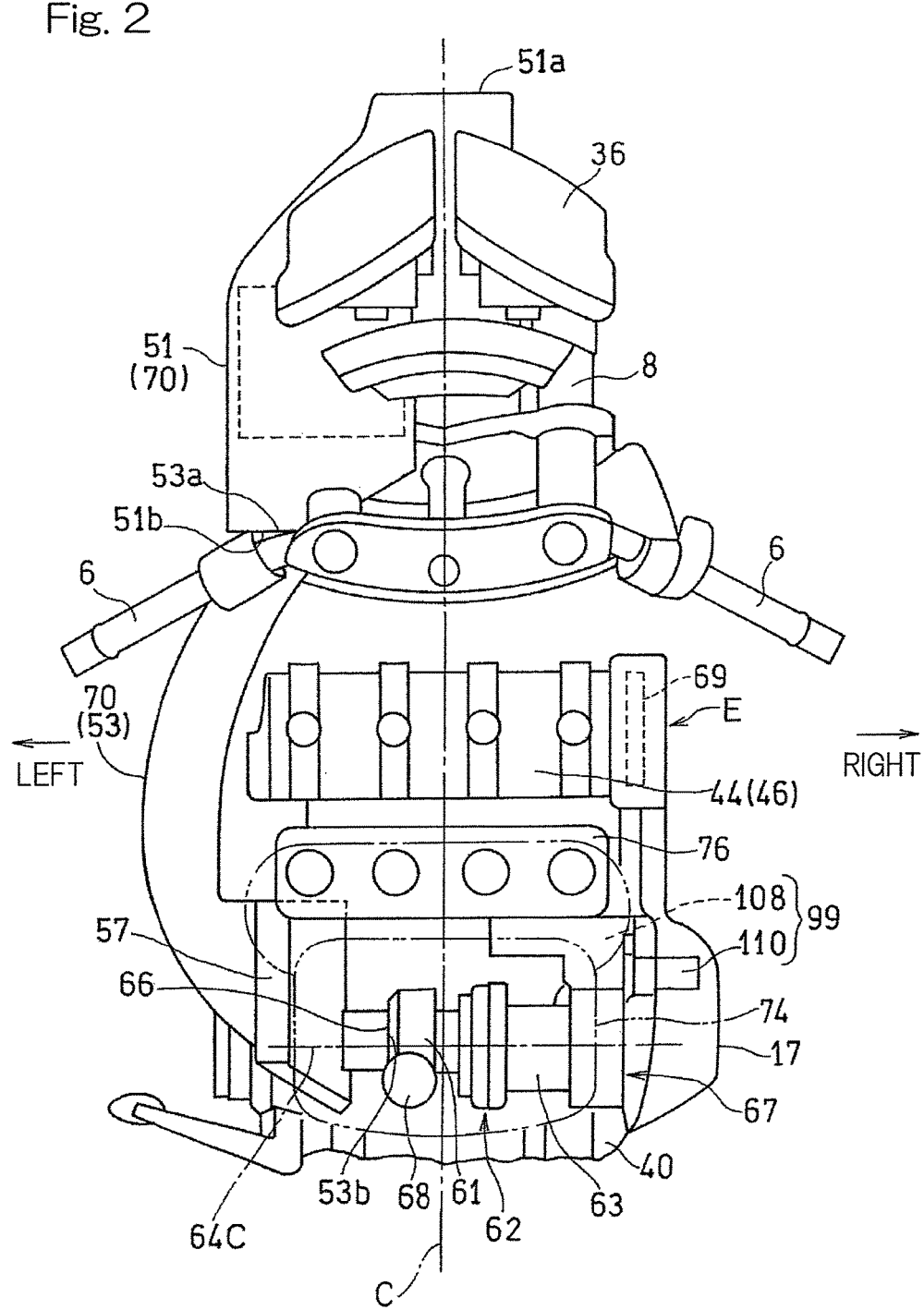
FIG. 2 is a plan view showing a state where some components in a front portion of the motorcycle are removed.

As shown in FIG. 2, a rear end portion 53b of the suction duct portion 53 is connected to the suction port 66 of the supercharger 62. The air cleaner 55 is provided within an intermediate portion of the ram duct unit 51 in the front-rear direction. Furthermore, an air storage portion 57 is formed at a downstream end portion of the suction duct portion 53. The air storage portion 57 has a flow passage area which is set larger than that of the other portion of the suction duct portion 53. The air storage portion 57 is located rearward of the cylinder block 42 and has an outlet to which the suction port 66 of the supercharger 62 is connected.

An intake air chamber 74 is disposed between the discharge port 68 and four intake ports 47 (FIG. 1) of the combustion engine E in the front-rear direction. The intake air chamber 74 forms a part of an air passage extending from the discharge port 68 of the supercharger 62 toward the cylinder head 44. The intake air chamber 74 has a width dimension over substantially the overall length of the combustion engine E in the widthwise direction of the motorcycle. As shown in FIG. 1, the intake air chamber 74 is disposed above the supercharger 62 and rearward of the cylinder block 42.

A throttle body 76 is disposed between the intake air chamber 74 and the cylinder head 44. In the throttle body 76, a fuel is injected into the intake air to generate a fuel-air mixture, and the fuel-air mixture is supplied through the respective intake ports 47 into combustion chambers (not shown) within four cylinder bores of the combustion engine E. The fuel tank 28 is disposed above the intake air chamber 74 and the throttle body 76.

As shown in FIG. 2, the supercharger 62 includes a pressure-feed portion 61 which pressurize the intake air and then supplies it to the combustion engine E, and a speed increasing portion 63 which increases the speed of rotation of the engine rotary shaft 39 and transmits the rotation to the pressure-feed portion 61. The pressure-feed portion 61 and the speed increasing portion 63 are housed in a supercharger case 67, and a lower portion of the supercharger case 67 is detachably mounted on the crankcase 40 of the combustion engine E.

The pressure-feed portion 61 and the speed increasing portion 63 are aligned in the widthwise direction of the motorcycle, and the speed increasing portion 63 is disposed so as to be displaced to one side in the widthwise direction of the motorcycle with respect to the center in the widthwise direction of the motorcycle, in the present embodiment, to the right side at which a cam chain 69 is disposed. Accordingly, while the supercharger 62 is disposed inward of both side surfaces of the combustion engine E in the widthwise direction of the motorcycle, the discharge port 68 of the pressure-feed portion 61 at the left side can be located in the vicinity of the center of the motorcycle. The supercharger case 67 is fixed to an upper surface of the crankcase 40 by means of a fastening member (not shown) such as a bolt.

Figure 5:
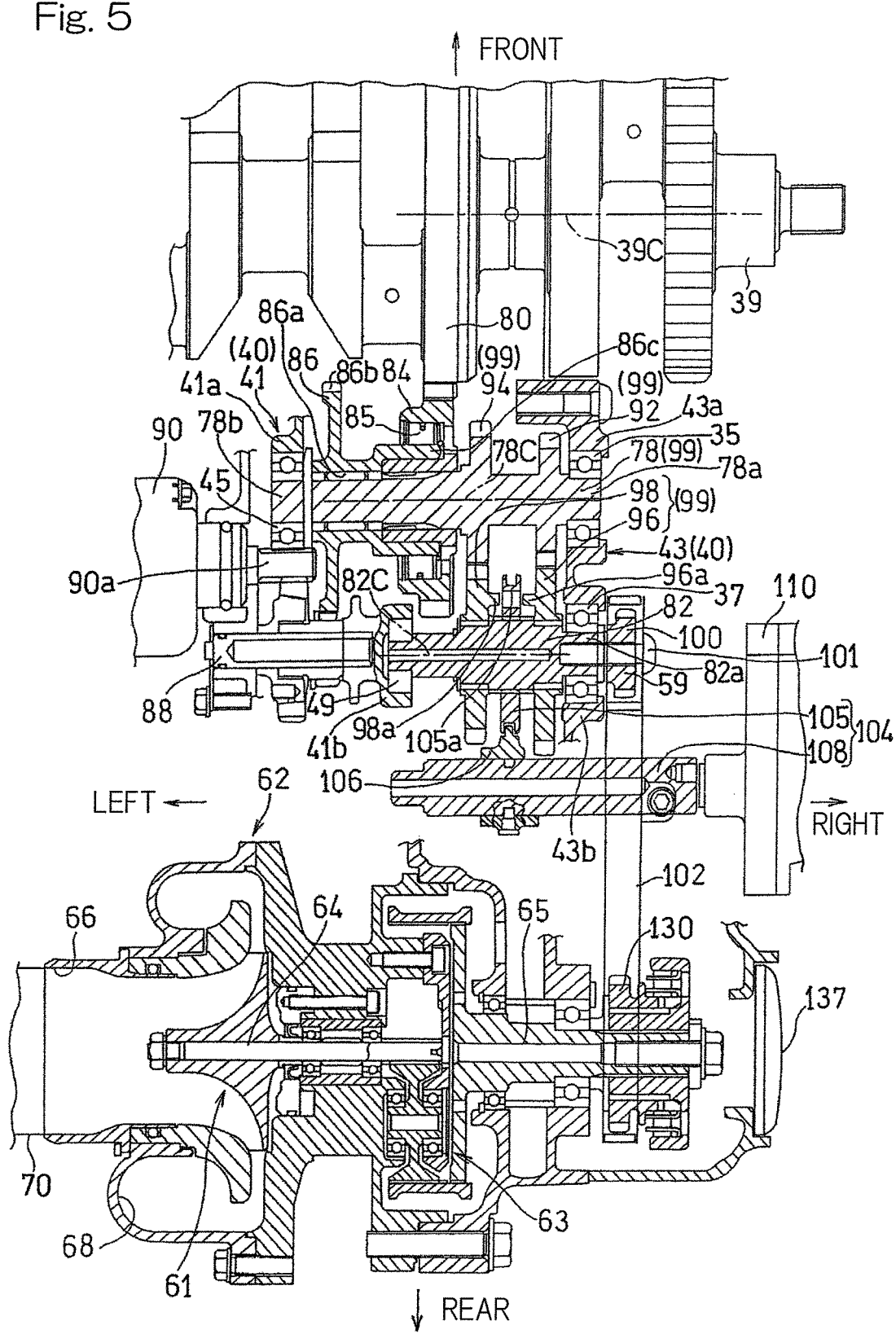
FIG. 5 is a shaft arrangement diagram showing a drive system for a supercharger in the combustion engine.

As shown in FIG. 5, a crank gear 80 which drives the counter shaft 78 is provided on the crankshaft 39 which is a rotary shaft of the combustion engine E. The counter shaft 78 has an axis 78C parallel to an axis 39C of the crankshaft 39. In addition, the supercharger drive shaft 82 is disposed rearward of and above the counter shaft 78, that is, at the side opposite to the crankshaft 39 with respect to the counter shaft 78. The supercharger drive shaft 82 also has an axis 82C parallel to the axis 39C of the crankshaft 39. The counter shaft 78 is disposed rearward of and above the crankshaft 39 and serves as an idler shaft. A drive gear 84 which meshes with the crank gear 80 on the crankshaft 39 is spline-fitted to the counter shaft 78 so as to be rotatable together with the counter shaft 78. A starter gear 86 is supported by the counter shaft 78 so as to be rotatable relative to the counter shaft 78, and a one-way clutch 85 is provided between the drive gear 84 and the starter gear 86.

Specifically, the starter gear 86 and the drive gear 84 are disposed on the counter shaft 78 so as to be adjacent to each other in an axial direction. The starter gear 86 has a through hole 86a extending therethrough in the axial direction, and the counter shaft 78 is inserted through the through hole 86a, whereby the starter gear 86 is supported by the counter shaft 78 so as to be rotatable relative to the counter shaft 78. The starter gear 86 and the drive gear 84 mesh with each other through the one-way clutch 85, whereby rotation of the starter gear 86 can be transmitted to the drive gear 84 and rotation from the drive gear 84 can be prevented from being transmitted to the starter gear 86.

The counter shaft 78 and the supercharger drive shaft 82 are respectively supported at both ends thereof by first end portions 78a, 82a thereof at the right side, which is one side in the widthwise direction of the motorcycle, and at second end portions 78b, 82b thereof at the left side, which is the other side in the widthwise direction of the motorcycle.

Specifically, the first end portions 78*a*, 82*a* of the counter shaft 78 and the supercharger drive shaft 82 are rotatably supported through bearings 35, 37 by first bearing portions 43*a*, 43*b* formed in the holder 43, respectively. The second end portions 78*b*, 82*b* are rotatably supported through bearings 45, 49 by second bearing portions 41*a*, 41*b* formed in a side wall of the crankcase body 41 of the crankcase 40, respectively.

Figure 6:
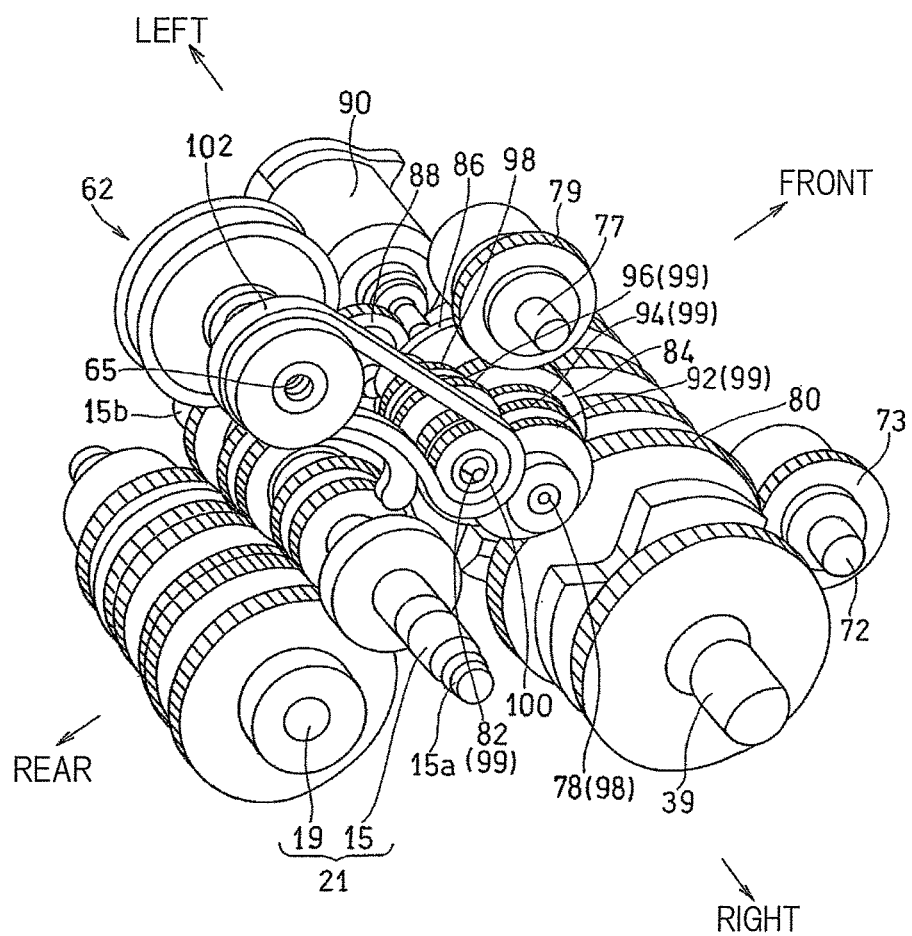
FIG. 6 is a perspective view showing the shaft arrangement of the combustion engine.
Figure 7:
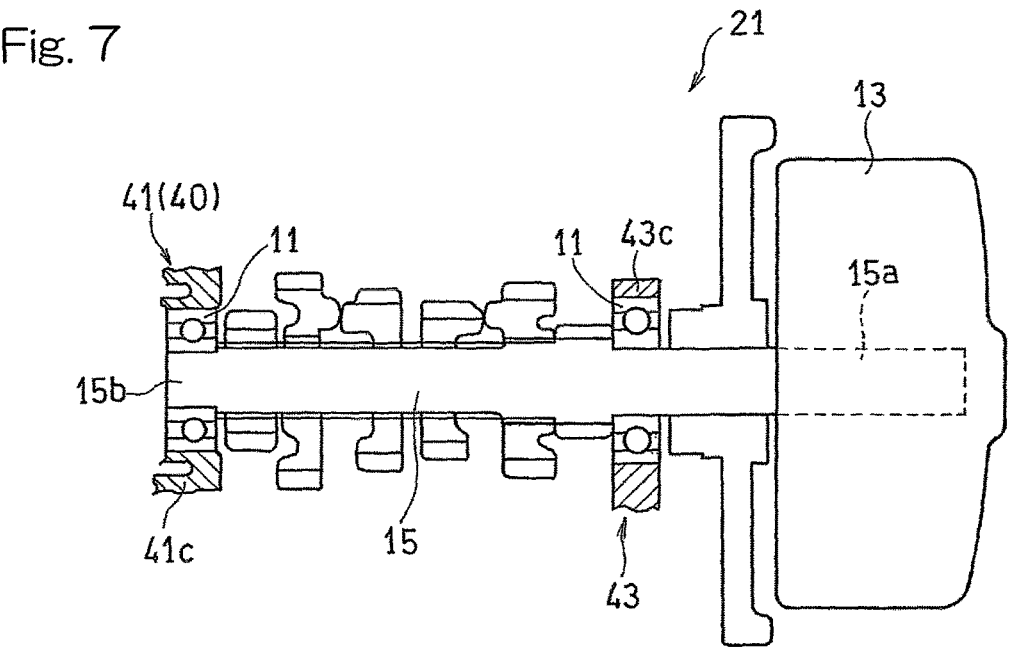
FIG. 7 is a shaft arrangement diagram of a driving speed reducer in the combustion engine.

As shown in FIG. 6, the driving reduction gear mechanism 21 includes the driving reduction gear mechanism input shaft 15 and the driving reduction gear mechanism output shaft 19, both of which extend in the widthwise direction of the motorcycle. As shown in FIG. 7, the driving reduction gear mechanism input shaft 15 is rotatably supported by bearings 11 in proximity to one end portion 15*a* thereof at the right side and at the other end portion 15*b* thereof at the left side. A clutch 13 is mounted on the one end portion 15*a* of the driving reduction gear mechanism input shaft 15. A third bearing portion 43*c* is formed in the holder 43 in FIG. 4 and supports the one end portion 15*a* of the driving reduction gear mechanism input shaft 15. A fourth bearing portion 41*c* is formed in the side wall of the crankcase body 41 of the crankcase 40 and supports the other end portion 15*b* of the driving reduction gear mechanism input shaft 15.

As shown in FIG. 6, a first balancer shaft 72 is disposed frontward of the crankshaft 39, that is, at the side opposite to the counter shaft 78 with respect to the crankshaft 39. A first balancer gear 73 which meshes with the crank gear 80 is provided on the first balancer shaft 72. In addition, a second balancer shaft 77 is disposed above the counter shaft 78 and rearward of the crankshaft 39. A second balancer gear 79 which meshes with the drive gear 84 is provided on the second balancer shaft 77. The balancer gears 73, 79 rotate together with the corresponding balancer shafts 72, 77.

Vibration of the combustion engine E is suppressed by such first and second balancer gears 73, 79 on the two shafts. In addition, since power for driving the supercharger 62 is obtained from the crank gear 80 which meshes with the first balancer gear 73, it is unnecessary to additionally provide a gear. Therefore, it is possible to reduce the number of components, and it is possible to suppress fluctuation of rotation of the supercharger 62 as compared to the case where power is obtained from a balancer gear.

A starter motor 90 is connected to the starter gear 86 shown in FIG. 5 through a torque limiter 88. Accordingly, when the starter motor 90 rotates in a state where the combustion engine E stops, starting torque is transmitted through the one-way clutch 85 to the crankshaft 39. In addition, after start-up of the combustion engine E, when a rotation speed of the crankshaft 39 becomes higher than that of the starter motor 90, the connection by the one-way clutch 85 is cut off to prevent power transmission from the crankshaft 39 to the starter motor 90. The one-way clutch 85, the torque limiter 88, and the starter gear 86 are disposed at the left side which is inward of the drive gear 84 in the widthwise direction of the motorcycle. The starter motor 90 is located at the left side of the supercharger 62.

The torque limiter 88 is provided between an output shaft 90*a* of the starter motor 90 and the starter gear 86. When transmitted torque becomes equal to or higher than a predetermined value, the torque limiter 88 cuts off connection between the output shaft 90*a* of the starter motor 90 and the starter gear 86. Thus, it is possible to prevent rotation of the crank gear 80 from being transmitted to the starter motor 90 when a phenomenon that the combustion engine reversely rotates occurs at the time of kick start.

The starter gear 86 includes an input gear 86*b* which receives power from the torque limiter 88, and an output gear 86*c* which provides power to the one-way clutch 85. The output gear 86*c* of the starter gear 86 is disposed inward of the one-way clutch 85 in the radial direction of the drive gear 84. In addition, as shown in FIG. 6, the starter gear 86, the torque limiter 88, and the starter motor 90 are disposed at the side (left side) opposite to later-described first and second speed gears 92, 94 with respect to the drive gear 84.

The small-diameter first speed gear 92 and the large-diameter second speed gear 94 are integrally formed and fixed to the counter shaft 78 in FIG. 5. The first and second speed gears 92, 94 are disposed outward of the drive gear 84 in the widthwise direction of the motorcycle. In the present embodiment, the two speed gears are provided, but three or more speed gears may be provided. A large-diameter third speed gear 96 and a small-diameter fourth speed gear 98 are provided on the supercharger drive shaft 82. The third speed gear 96 and the fourth speed gear 98 mesh with the first and second speed gears 92, 94, respectively. The third and fourth speed gears 96, 98 are mounted on the supercharger drive shaft 82 so as to be rotatable relative to the supercharger drive shaft 82 and not to be movable in the axial direction. In other words, a pair of gears is configured with the first speed gear 92 and the third speed gear 96 which mesh with each other, and a pair of gears is configured with the second speed gear 94 and the fourth speed gear 98 which mesh with each other.

The numbers of the teeth of the first speed gear 92 and the second speed gear 94 having different pitch diameters are different from each other, and thus the third and fourth speed gears 96, 98, which mesh with the first speed gear 92 and the second speed gear 94, respectively, have rotations speeds different from each other. In the present embodiment, since the diameter of the second speed gear 94 is larger than that of the first speed gear 92, the rotation speed of the fourth speed gear 98 is higher than that of the third speed gear 96. A later-described shift ring 105 is selectively engaged with either one of the third speed gear 96 and the fourth speed gear 98, whereby power from the crankshaft 39 is transmitted through either one of the speed gears 96, 98 to the supercharger drive shaft 82. In addition, when the shift ring 105 is released from the engagement with the speed gear 96 or 98, the power transmission state is released.

The counter shaft 78, the supercharger drive shaft 82, and the first to fourth speed gears 92, 94, 96, 98 constitute a power transmission mechanism 99 which transmits power from the crankshaft 39 to the supercharger 62. In the present embodiment, the power transmission mechanism 99 serves as a supercharger transmission 99 which changes the speed of power of the crankshaft 39 in addition to switching between transmission and non-transmission of power.

The first and second speed gears 92, 94 in FIG. 5 serve as input rotating members to which power of the crankshaft 39 is inputted, in the supercharger transmission 99. The third and fourth speed gears 96, 98 serve as output rotating members which change the speeds of rotations of these input rotating members and output the rotations. Furthermore, the counter shaft 78 and the supercharger drive shaft 82 constitute a power transmission shaft unit of the supercharger transmission (power transmission mechanism) 99. The counter shaft 78, on which the input rotating members 92, 94 are mounted, serves as an input shaft which is a first rotary shaft. The supercharger drive shaft 82, on which the output rotating members 96, 98 are mounted, serves as an output shaft which is a second rotary shaft. As described above, the drive gear 84 and the starter gear 86, in addition to the speed gears 92, 94, are fixed on the counter shaft 78, which is an input shaft of the supercharger transmission 99, so as to be aligned at the inner side in the widthwise direction of the motorcycle.

As shown in FIG. 6, the supercharger 62 is disposed rearward of the counter shaft 78. The starter motor 90 which meshes with the starter gear 86 through the torque limiter 88 is disposed forward of the supercharger 62. The counter shaft 78 is disposed rearward of the crankshaft 39, and the supercharger drive shaft 82 is disposed rearward and obliquely upward of the counter shaft 78. An input shaft 65 is disposed rearward and obliquely upward of the supercharger drive shaft 82. The input shaft 65 is connected to the supercharger rotary shaft 64 (FIG. 5). The supercharger rotary shaft 64 (FIG. 5) and the input shaft 65 are concentric with each other. The torque limiter 88 which is gear-connected to the counter shaft 78 is disposed above the counter shaft 78 and the supercharger drive shaft 82.

The supercharger drive shaft 82 which is an output shaft of the supercharger transmission 99 in FIG. 5 includes a projection 59 which projects rightward from the holder 43 in a state where the holder 43 is mounted on the crankcase body 41. A sprocket 100 which is a rotating member is fixed to the projection 59 by means of a bolt 101. A power transmission body 102 which is composed of an endless transmission member such as a chain is engaged with the sprocket 100.

As shown in FIG. 6, the third and fourth speed gears 96, 98, which are output rotating members, and the input shaft 65 for the supercharger rotary shaft 64 are disposed so as to be parallel to and spaced apart from each other. A rotational force of the supercharger drive shaft 82, that is, a rotational force of the crankshaft 39 is transmitted to the input shaft 65 through the power transmission body 102. The provision of the power transmission body 102 improves the degree of freedom in layout of the output rotating members 96, 98 and the input shaft 65. In the present embodiment, a chain 102 is used as the power transmission body, but the power transmission body is not limited to the chain and may be, for example, a gear.

Since the chain 102 shown in FIG. 5 is disposed at the right side which is the side opposite to the suction port 66 of the supercharger 62 in the widthwise direction of the motorcycle, it is possible to prevent interfere between the chain 102 and the intake duct 70 connected to the suction port 66. In the present embodiment, the counter shaft 78 and the supercharger drive shaft 82 are connected directly to each other, but may be connected indirectly to each other through an idle gear or the like. The supercharger 62 will be described in detail later.

A shifter 104 is disposed between the third speed gear 96 and the fourth speed gear 98 on the supercharger drive shaft 82. The shifter 104 includes the shift ring 105, a shift fork 106 which operates the shift ring 105, and a change drum 108 which moves the shift fork 106 parallel with the supercharger drive shaft 82. The shift ring 105 is spline-fitted to the supercharger drive shaft 82, whereby the shift ring 105 is not rotatable relative to the supercharger drive shaft 82 and is movable in the axial direction.

The change drum 108 is driven to rotate by shifter driving device 110 and moves the shift fork 106 in the axial direction to cause an engagement hole 105a provided in the shift ring 105 to be selectively engaged with either one of dogs 96a, 98a provided on the third and fourth speed gears 96, 98. Accordingly, the shift ring 105 is selectively engaged with either one of the third and fourth speed gears 96, 98 such that the shift ring 105 is not rotatable relative thereto.

That is, the dogs 96a, 98a are supported by the supercharger drive shaft 82 which is located closer to the change drum 108 than the counter shaft 78, and selectably switch between a connection state where rotation of the pair of gears is transmitted to the supercharger 62 and a cut-off state where mesh of the pair of gears is released. As described above, the shift ring 105 and the dogs 96a, 98a serve as a selective connection body which selectively switches a plurality of pairs of gears. The shift ring 105, the shift fork 106, the change drum 108, the shifter driving device 110 and the dogs 96a, 98a constitute a part of the above-described supercharger transmission 99.

The shifter driving device 110 is disposed at a right side end which is the side opposite to the starter motor 90. Accordingly, it is possible to mount and dismount the shifter driving device 110 relative to the motorcycle without interfering with the starter motor 90, the starter gear 86, or the like. Thus, it is possible to position the shift ring 105 at a predetermined position in a state where the shifter driving device 110 is dismounted to reduce resistance. By connecting the shifter driving device 110 and the change drum 108 after such positioning, it is possible to easily perform a maintenance operation.

As shown in FIG. 4, the supercharger 62 and the supercharger transmission 99 are aligned in a direction perpendicular to the widthwise direction of the motorcycle, and are aligned in the front-rear direction and the up-down direction in the present embodiment. Specifically, as shown in FIG. 2, the supercharger 62 is disposed rearward of the change drum 108 and the shifter driving device 110 of the supercharger transmission 99.

The change drum 108 and the shifter driving device 110 of the supercharger transmission 99 shown in FIG. 5 are disposed so as to be displaced to one side in the widthwise direction of the motorcycle with respect to the center of the motorcycle, specifically, to the right side. The dogs 96a, 98a and the shift fork 106 may be provided to either the counter shaft 78 or the supercharger drive shaft 82, but when the dogs 96a, 98a and the shift fork 106 are provided to the supercharger drive shaft 82, which is the output shaft of the supercharger transmission 99, as in the present embodiment, it is possible to shorten the shift fork 106 as compared to the case where the dogs 96a, 98a and the shift fork 106 are provided to the counter shaft 78.

Power is transmitted from the counter shaft 78 to the supercharger drive shaft 82 through the selected speed gear 96 or 98. That is, when the shift ring 105 and the third speed gear 96 are dog-connected to each other, rotation of the counter shaft 78, that is, rotation of the crankshaft 39 is transmitted to the supercharger drive shaft 82 at a large speed increasing ratio. On the other hand, when the shift fork 106 and the fourth speed gear 98 are dog-connected to each other, the rotation of the counter shaft 78 is transmitted to the supercharger drive shaft 82 at a small speed increasing ratio.

Accordingly, the rotational power of the crankshaft 39 is transmitted from the counter shaft 78 to the supercharger drive shaft 82 of the supercharger 62 through the selected speed gear 96 or 98. Since the power is transmitted from the crank gear 80 as described above, it is possible to prevent fluctuation of rotation of the supercharger 62 as compared to the case where power is transmitted from a balancer gear. The shifter driving device 110 includes, for example, a servomotor which operates in accordance with an instruction from a vehicle controller. However, the shifter driving device 110 is not limited thereto, and, for example, may provide power by a manual operation.

Figure 8:
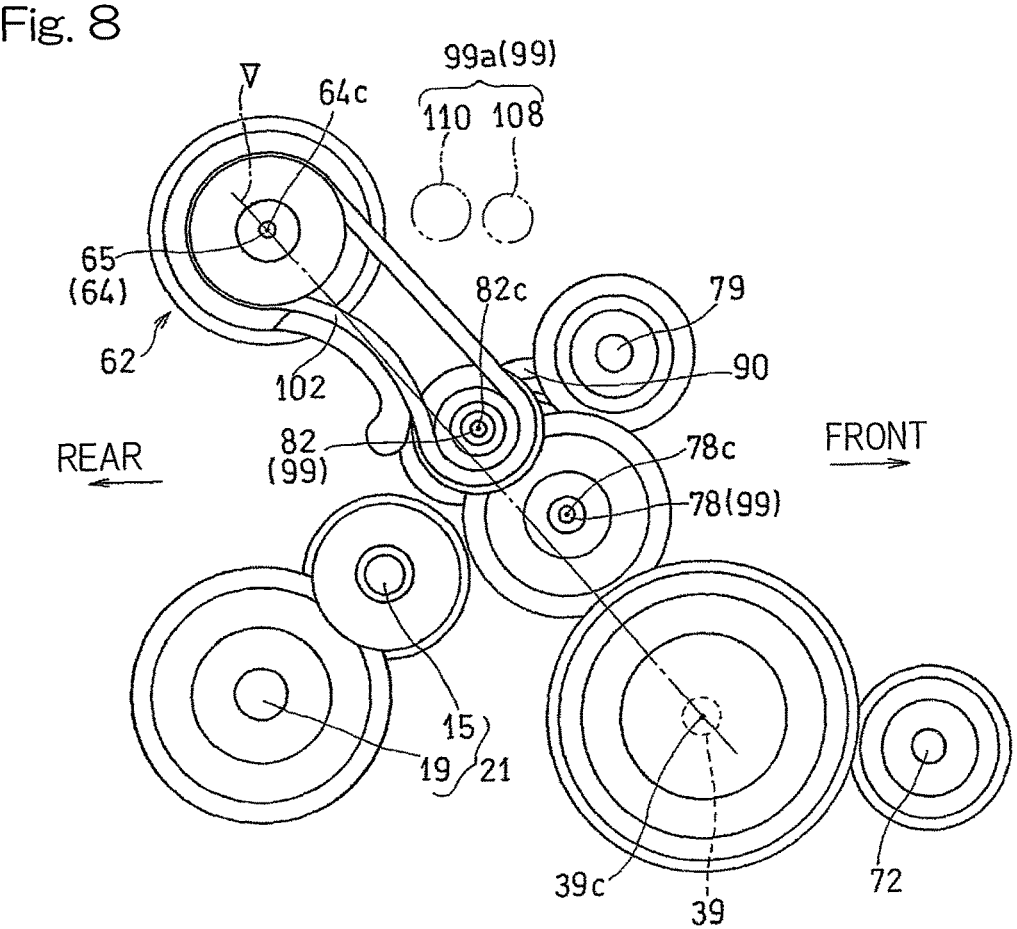
FIG. 8 is a right side view showing the shaft arrangement of the combustion engine.

FIG. 8 is a right side view showing the arrangement of each shaft. In FIG. 8, the counter shaft 78, which is the input shaft of the supercharger transmission 99, and the supercharger drive shaft 82, which is the output shaft of the supercharger transmission 99, are disposed on a virtual straight line V connecting the axis 39C of the crankshaft 39 and the axis 64C of the supercharger rotary shaft 64 or adjacently to the virtual straight line V. The supercharger drive shaft 82 is disposed closer to the supercharger 62 than the counter shaft 78.

Thus, the chain 102, which is the power transmission body connecting the supercharger drive shaft 82 and the supercharger rotary shaft 64, becomes short. In addition, the change drum 108 and the shifter driving device 110, which constitute the transmission 99, are disposed above the counter shaft 78 and the supercharger drive shaft 82, which are the input and output shafts of the supercharger transmission 99, and above the chain 102. Accordingly, the distance between the change drum 108 and the supercharger drive shaft 82 becomes short, and the shift fork 106 can be shortened.

The shifter driving device 110 in FIG. 5 moves the shift fork 106 in the axial direction of the change drum 108, for example, in accordance with the rotation speed of the combustion engine E to cause the shift fork 106 to select one of the third and fourth speed gears 96, 98 that is suited for the rotation speed. Specifically, in a low rotation region of the combustion engine E, the shift ring 105 is dog-connected to the third speed gear 96, and the speed increasing ratio of the supercharger 62 is increased to a first gear ratio. Accordingly, setting is performed such that a supercharging pressure, that is, a supercharging wind volume is increased to obtain a combustion engine torque at a low speed. At the first gear ratio, the rotational power of the crankshaft 39 is transmitted to the supercharger drive shaft 82 of the supercharger 62 through the first speed gear 92 and the third speed gear 96 (a first power transmission path).

Meanwhile, in a high rotation region of the combustion engine E, the shift ring 105 is dog-connected to the fourth speed gear 98, and the speed increasing ratio of the supercharger 62 is decreased to a second gear ratio. Accordingly, setting is performed such that the supercharging wind volume is prevented from being excessive and appropriate combustion engine torque and stable rotation are obtained. At the second gear ratio, the rotational power of the crankshaft 39 is transmitted to the supercharger drive shaft 82 of the supercharger 62 through the second speed gear 94 and the fourth speed gear 98 (a second power transmission path).

That is, on the second power transmission path, the rotation of the drive gear 84 is transmitted to the sprocket 100 and the chain 102 without being transmitted through the pair of gears composed of the first speed gear 92 and the third speed gear 96. As described above, the supercharger transmission 99 selects the first power transmission path on which power is transmitted at the first gear ratio and the second power transmission path on which power is transmitted at the second gear ratio different from the first gear ratio. In the case where supercharging is not required, connection between each of the speed gears 96, 98 and the shift ring 105 is released.

Figure 9:
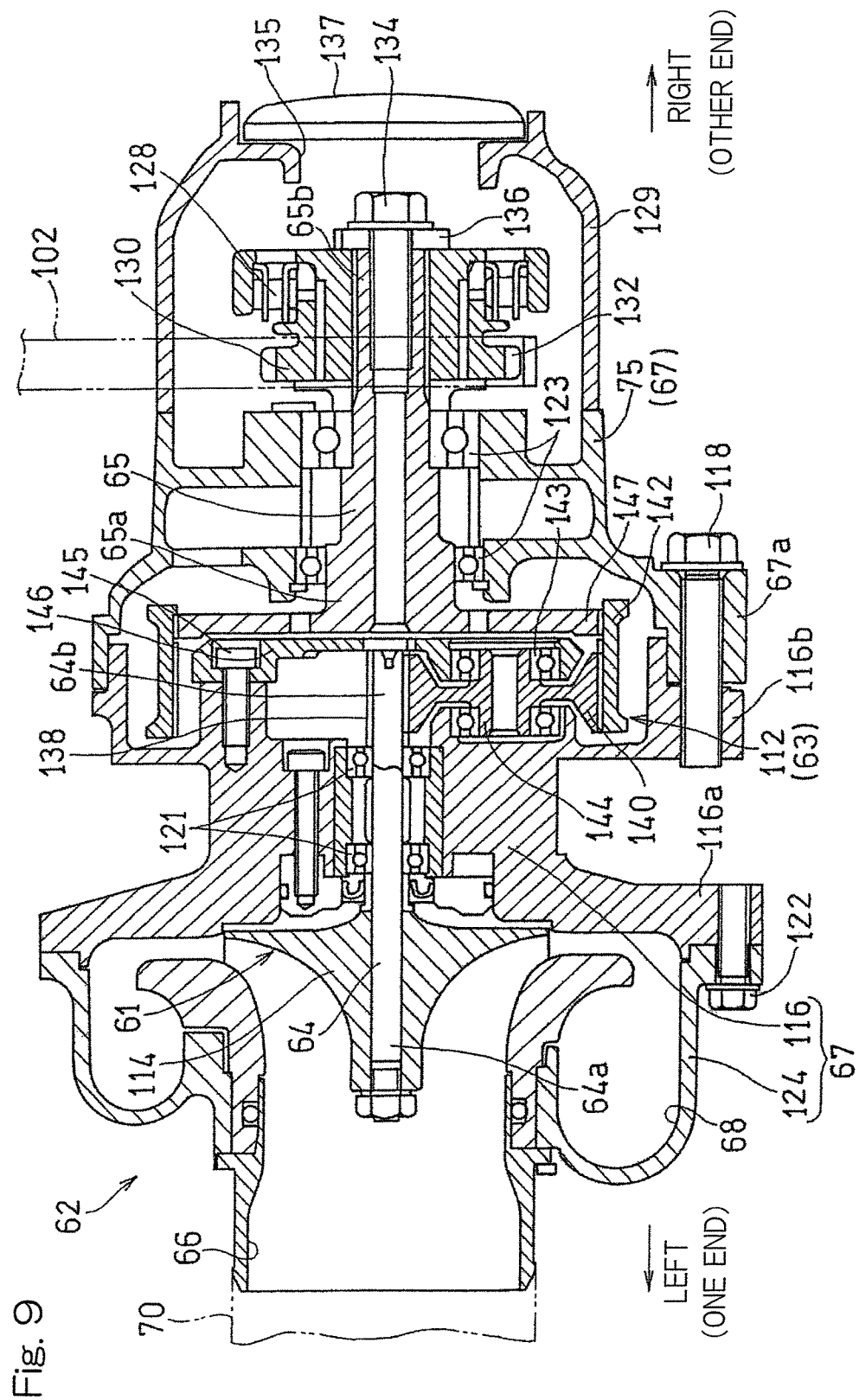
FIG. 9 is a horizontal cross-sectional view showing the supercharger.

FIG. 9 is a horizontal cross-sectional view of the supercharger 62. As shown in FIG. 9, the pressure-feed portion 61 of the supercharger 62 is composed of a centrifugal pump, and pressurizes intake air introduced from the axial direction and discharges the intake air to the radially outer side by a centrifugal force generated by rotation of an impeller 114. The impeller 114 of the pressure-feed portion 61 is fixed to one end portion 64a of the supercharger rotary shaft 64. The other end portion 64b of the supercharger rotary shaft 64 is connected to one end portion 65a (the left side in the widthwise direction of the motorcycle) of the input shaft 65 of the speed increasing portion 63 through a planetary gear device 112 which forms the speed increasing portion 63. The speed increasing portion 63 provides power to the supercharger rotary shaft 64 which is a rotary shaft for the impeller 114, and after increasing the speed of a rotational force inputted thereto, outputs the rotational force toward the impeller 114. Hereinafter, one end side in the supercharger 62 refers to the left side in the widthwise direction of the motorcycle, and the other end side in the supercharger 62 refers to the right side in the widthwise direction of the motorcycle.

The supercharger case 67 includes a casing portion 116 which rotatably supports the supercharger rotary shaft 64 through bearings 121, and a housing portion 124 which covers the impeller 114. The housing portion 124 is mounted on a first flange 116a at one end side of the casing portion 116 with a casing fastening member 122 such as a bolt. A second flange 116b at the other end side of the casing portion 116 is fixed to a case flange 67a of the supercharger case 67 with a housing fastening member 118. The bearings 121 constitute a support portion for the supercharger rotary shaft 64.

In this manner, the supercharger rotary shaft 64 and the bearings 121 which are the support portion for the supercharger rotary shaft 64 are covered with the casing portion 116, and the impeller 114 is covered with the housing portion 124. The suction port 66 and the discharge port 68 are formed in the housing portion 124.

The input shaft 65 is composed of a hollow shaft and is rotatably supported by a speed increasing portion housing portion 75, which is a part of the supercharger case 67 and accommodates the speed increasing portion 63, through bearings 123. Spline teeth are formed on the outer peripheral surface of the other end portion 65b of the input shaft 65, and a one-way clutch 128 is spline-fitted to the outer peripheral surface. A sprocket 130 is connected to the input shaft 65 through the one-way clutch 128. The chain 102 is entrained on a gear 132 of the sprocket 130, and rotation of the supercharger drive shaft 82 (FIG. 5) is transmitted to the input shaft 65 through the chain 102.

An internal thread portion is formed on the inner peripheral surface of the other end portion 65b of the input shaft 65, and a bolt 134 is screwed into the internal thread. The one-way clutch 128 is mounted on the other end portion 65b through a washer 136 by a head portion of the bolt 134. The one-way clutch 128, the sprocket 130, and the bolt 134 are housed in a sprocket cover 129. The sprocket cover 129 is connected to the other end of the speed increasing portion housing portion 75. The sprocket cover 129 has an opening 135 formed at the other end thereof so as to face toward the outside of the motorcycle, and the opening 135 is closed by a cap 137.

The sprockets 100, 130 shown in FIG. 5 are disposed at the right ends of the supercharger drive shaft 82 and the input shaft 65, respectively. The supercharger transmission 99 and the speed increasing portion 63 are disposed inward (at the left side) of the sprockets 100, 130 in the widthwise direction of the motorcycle, respectively. When rotation of the input shaft 65 becomes faster than that of the sprocket 130, the one-way clutch 128 in FIG. 9 idles to cut off the connection between the input shaft 65 and the sprocket 130. Since the input shaft 65 and the sprocket 130 are connected through such a one-way clutch 128, it is possible to rotate the input shaft 65 while fluctuation of rotation generated in the combustion engine E is reduced.

As described above, the planetary gear device 112 is disposed between the input shaft 65 and the supercharger rotary shaft 64 and is supported by the supercharger case 67. External teeth 138 are formed on the other end portion 64*b* of the supercharger rotary shaft 64, and a plurality of planetary gears 140 are aligned in a circumferential direction and are gear-connected to the external teeth 138. That is, the external teeth 138 of the supercharger rotary shaft 64 serve as a sun gear of the planetary gear device 112. Furthermore, the planetary gears 140 are gear-connected to a large-diameter internal gear (ring gear) 142 at the radially outer side. Each planetary gear 140 is rotatably supported by a carrier shaft 144 through a bearing 143 mounted on the other end portion of the casing portion 116.

The carrier shaft 144 includes a fixed member 146, and the fixed member 146 is fixed to the casing portion 116 by means of a bolt 145. That is, the carrier shaft 144 is fixed. An input gear 147 is provided on one end portion of the input shaft 65 and is gear-connected to the internal gear 142. As described above, the internal gear 142 is gear-connected so as to rotate in the same rotation direction as the input shaft 65, the carrier shaft 144 is fixed, and the planetary gears 140 rotate in the same rotation direction as the internal gear 142. The sun gear (external gear 138) is formed on the supercharger rotary shaft 64 which is an output shaft, and rotates in a rotation direction opposite to that of the planetary gears 140. That is, the planetary gear device 112 increases the speed of rotation of the input shaft 65 and transmits the rotation in a rotation direction opposite to that of the input shaft 65, to the supercharger rotary shaft 64.

When the combustion engine E rotates, the crankshaft 39 shown in FIG. 5 rotates, and the counter shaft 78 rotates in conjunction with the crankshaft 39 because of the mesh of the drive gear 84 and the crank gear 80. When the counter shaft 78 rotates, the supercharger drive shaft 82 rotates through the pair of gears. When the supercharger drive shaft 82 rotates, the input shaft 65 rotates through the chain 102. Furthermore, the supercharger rotary shaft 64 rotates through the planetary gear device 112, so that the supercharger 62 starts up.

When the motorcycle travels, incoming wind passes from the air inlet 38 shown in FIG. 1 through the ram duct unit 51, and then is, after cleaned by the air cleaner 55, introduced to the supercharger 62 through the suction duct portion 53. The incoming wind introduced into the supercharger 62 is pressurized by the supercharger 62 and is introduced into the combustion engine E through the intake air chamber 74 and the throttle body 76. Because of a synergetic effect of the pressurization by the ram pressure and the pressurization by the supercharger 62 as described above, it is possible to supply high-pressure intake air to the combustion engine E. However, the pressurization by the ram pressure may not be performed, and an air inlet may be provided in a portion other than the front portion of the motorcycle.

In the configuration described above, as shown in FIG. 4, the supercharger 62 and the supercharger transmission 99 are aligned in the direction perpendicular to the widthwise direction of the motorcycle, for example, in the front-rear direction and the up-down direction. Thus, it is possible to reduce the dimension in the widthwise direction of the motorcycle as compared to the case where the supercharger 62 and the supercharger transmission 99 are aligned in the widthwise direction of the motorcycle. Since the dimension in the widthwise direction of the motorcycle is reduced as described above, the degree of freedom in designing the positions of the suction port 66 and the discharge port 68 of the supercharger 62 in FIG. 2 in the widthwise direction of the motorcycle is improved. Thus, a space is formed around the suction port 66, and the intake duct 70 is easily disposed.

The supercharger 62 includes the pressure-feed portion 61 and the speed increasing portion 63 aligned relative to each other in the widthwise direction of the motorcycle, and the dimension of the supercharger 62 itself in the widthwise direction of the motorcycle is increased. However, as shown in FIG. 4, the supercharger transmission 99 is aligned relative to the supercharger 62 in the direction perpendicular to the widthwise direction of the motorcycle, that is, is displaced relative to the supercharger 62 in the front-rear direction and the up-down direction. Thus, it is possible to reduce the overall dimension of the supercharger 62 and the supercharger transmission 99 in the widthwise direction of the motorcycle.

As shown in FIG. 2, the combustion engine E is a four-cylinder four-cycle type parallel multi-cylinder engine with respective cylinders aligned in the widthwise direction of the motorcycle, and the speed increasing portion 63 of the supercharger 62 is disposed so as to be displaced to the right side which is one side in the widthwise direction of the motorcycle with respect to a center C in the widthwise direction of the motorcycle. Thus, it is easy to locate the discharge port 68 of the supercharger 62 in the center portion in the widthwise direction of the motorcycle as compared to the case where the supercharger 62 and the supercharger transmission 99 are aligned in the widthwise direction of the motorcycle. Since the discharge port 68 is located in the vicinity of the center portion, it is easy to uniformly take air into each cylinder to improve the intake efficiency.

Moreover, the supercharger 62 is disposed rearward of the supercharger transmission 99, and the intake air chamber 74 is disposed between the supercharger 62 and the cylinder block 42 in the front-rear direction. Since the supercharger 62 is disposed rearward of the supercharger transmission 99 as described above, the dimension between the cylinder block 42 and the discharge port 68 of the supercharger 62 in the front-rear direction is increased. Thus, it is possible to increase the dimension of the intake air chamber 74 in the front-rear direction, thereby ensuring a desired volume of the intake air chamber 74 while the dimension in the up-down direction is reduced.

As shown in FIG. 8, the input and output shafts 78, 82 of the supercharger transmission 99 are disposed adjacently to the virtual straight line V connecting the crankshaft 39 and the supercharger rotary shaft 64. Thus, it is possible to shorten the chain 102 connecting the supercharger rotary shaft 64 and the output shaft 82 of the supercharger transmission 99.

As shown in FIG. 2, the suction port 66 of the supercharger 62 is located at a position shifted inwardly in the widthwise direction of the motorcycle from a side surface of the combustion engine E, and the intake duct 70 is connected to the suction port 66 from the outer side in the widthwise direction of the motorcycle. As shown in FIG. 4, the supercharger 62 and the supercharger transmission 99 are aligned in the front-rear direction and the up-down direction, whereby the dimension in the widthwise direction of the motorcycle is reduced. Thus, it is easy to locate the suction port 66 shown in FIG. 2 at the inner side of the combustion engine E. Since the suction port 66 is located at the inner side of the combustion engine E, it is possible to increase the cross-sectional shape and the curvature radius of the intake duct 70 around the suction port 66 to prevent a decrease in the intake efficiency.

As shown in FIG. 5, the third and fourth speed gears 96, 98, on which the dogs 96a, 98a are formed, are supported by the supercharger drive shaft (output shaft) 82, which is located close to the change drum 108. Thus, the distance between the change drum 108 and the dogs 96a, 98a becomes short, and it is possible to shorten the shift fork 106.

The starter gear 86 is fixed to the counter shaft 78, which is the input shaft of the supercharger transmission 99. Since the input shaft of the supercharger transmission 99 is also used for fixing another gear as described above, it is possible to reduce the number of components, and space saving is achieved.

The first end portions 78a, 82a of the input and output shafts 78, 82 of the supercharger transmission 99 are supported by the holder 43, and the second end portions 78b, 82b of the input and output shafts 78, 82 are supported by the crankcase body 41 of the crankcase 40. Thus, it is easy to mount the input and output shafts 78, 82 of the supercharger transmission 99 on the crankcase 40 as compared to the case where the input and output shafts 78, 82 are supported at both ends thereof by the crankcase 40.

Specifically, the input and output shafts 78, 82 are put into the crankcase body 41 so that the second bearing portions 41a, 41b of the crankcase body 41 are caused to support the second end portions 78b, 82b, and the holder 43 is mounted on the crankcase body 41 so that the first bearing portions 43a, 43b of the holder 43 are caused to support the first end portions 78a, 82a. Alternatively, in a state where the first end portions 78a, 82a are supported by the first bearing portions 43a, 43b of the holder 43, the second bearing portions 41a, 41b of the crankcase body 41 are caused to support the second end portions 78b, 82b so that the holder 43 can be mounted on the crankcase body 41. Thus, even in the case where a gear, a sprocket, or the like which is a rotating member having a larger diameter than that of the shaft body is provided on each of the input and output shafts 78, 82 of the supercharger transmission 99, it is possible to easily mount the input and output shafts 78, 82 of the supercharger transmission 99 on the crankcase 40.

The projection 59 is provided on the output shaft 82 of the supercharger transmission 99, the sprocket 100 is fixed to the projection 59, and the chain 102 which transmits rotation of the sprocket 100 to the supercharger 62 is provided. Thus, in a state where the holder 43 is mounted on the crankcase 40, the projection 59 is exposed to the right side which is one side in the widthwise direction of the motorcycle, and the chain 102 is easily connected to the sprocket 100. Furthermore, since the chain 102 is used as the power transmission body, it is possible to absorb a dimension error between the respective shafts, and gear ratio adjustment is made easy by changing the shape of the sprocket 100.

Since each pair of gears which are in mesh with each other is supported on the input and output shafts 78, 82 of the supercharger transmission 99, it is possible to assemble the input and output shafts 78, 82 to the crankcase 40 in a state where each pair of gears are in mesh with each other, thereby further improving the assemblability.

The shift ring 105 and the third and fourth speed gears 96, 98, on which the dogs 96a, 98a are formed, are supported on the supercharger drive shaft 82, which is the output shaft of the supercharger transmission 99. Thus, it is possible to assemble the supercharger transmission 99 to the crankcase 40 in a state where the shift ring 105 and the third and fourth speed gears 96, 98 are mounted on the supercharger drive shaft 82 and the plurality of pairs of gears and the dogs 96a, 98a are in mesh. Therefore, the assemblability is improved.

As shown in FIG. 7, the driving reduction gear mechanism input shaft 15 of the driving reduction gear mechanism 21 is supported at the one end portion 15a thereof in the widthwise direction of the motorcycle by the third bearing portion 43c formed in the holder 43 and is supported at the other end portion 15b thereof by the fourth bearing portion 41c of the crankcase body 41 of the crankcase 40. Thus, the holder 43 and a transmission holder are shared as one component, and it is possible to reduce the number of components.

As shown in FIG. 5, the starter gear 86 is disposed on the counter shaft 78 so as to be aligned together with the counter gear 84 in the widthwise direction of the motorcycle. Thus, it is unnecessary to provide a dedicated rotary shaft for the starter gear 86, and it is possible to reduce the number of components. As shown in FIG. 6, the supercharger 62 is disposed rearward of the counter shaft 78, which serves as an idler shaft, and the starter motor 90, which meshes with the starter gear 86, is disposed frontward of the supercharger 62. Thus, it is possible to dispose the starter motor 90 in an empty space between the supercharger 62 and the counter shaft 78 in the front-rear direction. As a result, it is possible to prevent an increase in the dimension of the combustion engine in the widthwise direction of the motorcycle.

As shown in FIG. 5, the starter gear 86 is disposed inward (at the left side) of the counter gear 84 in the widthwise direction of the motorcycle. Thus, in accessing from the outer side (right side) in the widthwise direction of the motorcycle and mounting or dismounting the supercharger 62, it is possible to easily mount or dismount the supercharger 62 without being disturbed by the starter gear 86.

As shown in FIG. 2, the supercharger 62 is disposed above the rear portion of the crankcase 40, and the intake air chamber 74 is disposed between the discharge port 68 of the supercharger 62 and the intake ports 47 (FIG. 1) of the combustion engine E in the front-rear direction. Since the supercharger 62 is disposed above the rear portion of the crankcase 40, the distance between the discharge port 68 of the supercharger 62 and the intake ports 47 (FIG. 1) of the combustion engine E in the front-rear direction becomes long. As a result, it is possible to increase the dimension of the intake air chamber 74 in the front-rear direction, and it is possible to ensure an increased chamber capacity without increasing the dimension of the intake air chamber 74 in the up-down direction. In addition, since an increase in the dimension of the intake air chamber 74 in the up-down direction is prevented, it is easy to dispose the starter motor 90 and the like.

Figure 10:
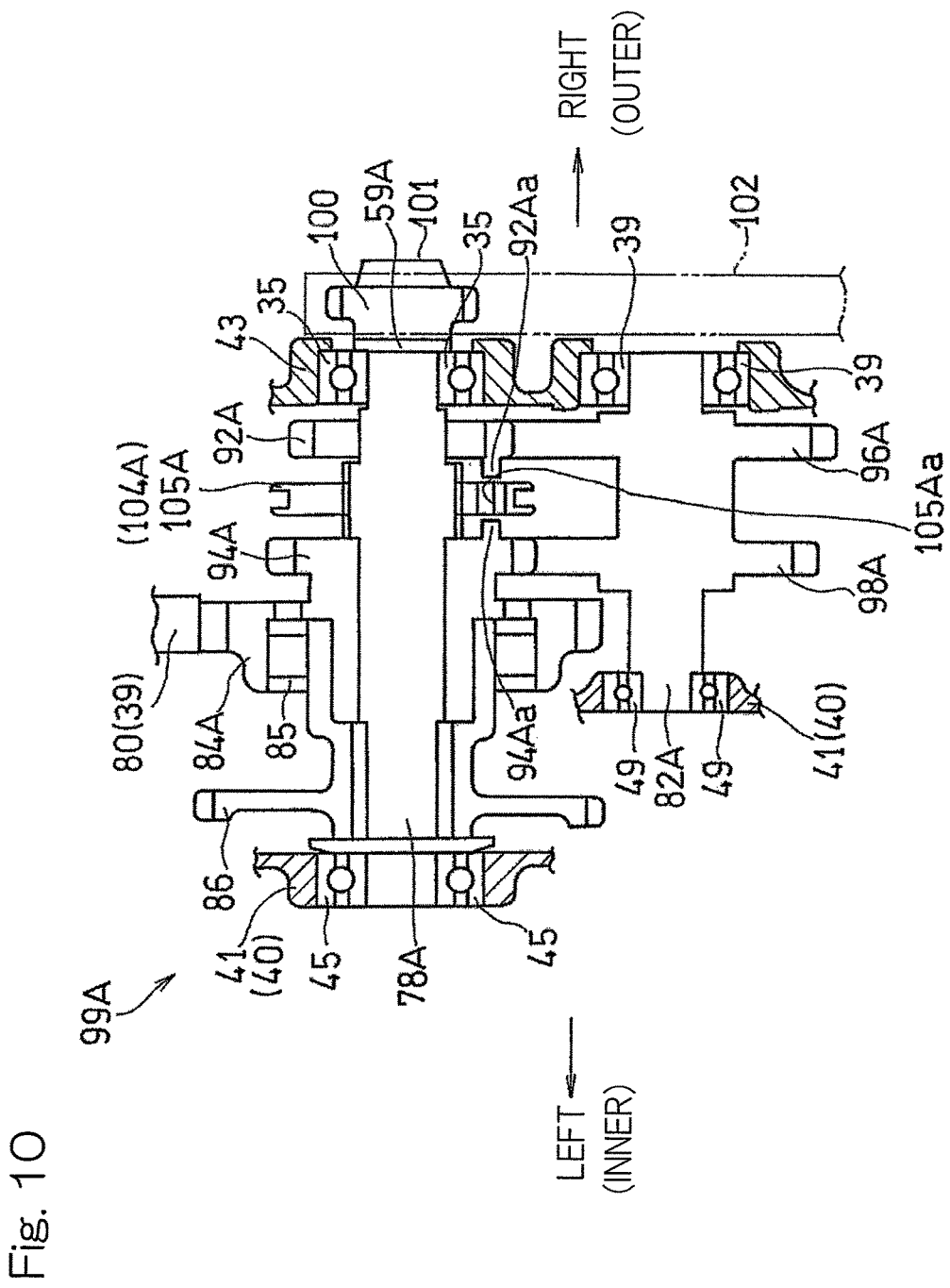
FIG. 10 is a horizontal cross-sectional view showing another transmission of the supercharger-equipped combustion engine.

FIG. 10 shows another example of the supercharger transmission 99. As shown in FIG. 10, in this example, unlike the embodiment of FIG. 5, a drive gear 84A which meshes with the crank gear 80 of the crankshaft 39 is formed integrally with a second speed gear 94A and is supported by a counter shaft 78A so as to be rotatable relative to the counter shaft 78A. In addition, a small-diameter first speed gear 92A is supported outward of the second speed gear 94A in the widthwise direction of the motorcycle by the counter shaft 78A so as to be rotatable relative to the counter shaft 78A. That is, the drive gear 84A, which is supported by the counter shaft 78A, constitutes an input portion to which power is inputted from the crankshaft 39.

A shifter 104A is disposed between the first speed gear 92A and the second speed gear 94A on the counter shaft 78A. A shift ring 105A which constitutes a part of the shifter 104A is spline-fitted to the counter shaft 78A, whereby the shift ring 105A is not rotatable relative to the counter shaft 78A and is movable in the axial direction.

A shift fork (not shown) is moved in the axial direction to cause an engagement hole 105Aa, which is provided in the shift ring 105A, to be selectively engaged with either one of dogs 92Aa, 94Aa provided in the first and second speed gears 92A, 94A. Accordingly, the shift ring 105A is selectively engaged with either one of the first and second speed gears 92A, 94A so as not to be rotatable relative thereto.

The counter shaft 78A includes a projection 59A which projects rightward from the holder 43 in a state where the holder 43 is mounted on the crankcase body 41. The sprocket 100 is fixed to the projection 59A by means of the bolt 101. The chain 102, which transmits power from the crankshaft 39 to the supercharger 62 (FIG. 5), is engaged with the sprocket 100. That is, the sprocket 100, which is supported by the counter shaft 78A, and the chain 102 constitute an output portion which outputs power inputted from the crankshaft 39 to the supercharger 62 (FIG. 5).

A large-diameter third speed gear 96A and a small-diameter fourth speed gear 98A which mesh with the first and second speed gears 92A, 94A, respectively, are provided on a supercharger drive shaft 82A. The first speed gear 92A and the third speed gear 96A constitute one pair of gears which mesh with each other. The second speed gear 94A and the fourth speed gear 98A constitute another pair of gears which mesh with each other. The third and fourth speed gears 96A, 98A are formed integrally on the supercharger drive shaft 82 so as not to be rotatable relative to the supercharger drive shaft 82. The other structure is the same as in the example of FIG. 5.

On a first power transmission path of this example in FIG. 10, the shift ring 105A is dog-connected to the first speed gear 92A (a first gear ratio), and rotational power of the crankshaft 39 is inputted from the drive gear 84A through the crank gear 80. The rotational power is transmitted through the second speed gear 94A, the fourth speed gear 98A, the third speed gear 96A, and the first speed gear 92A to the chain 102 on the counter shaft 78A. That is, on the first power transmission path, rotation of the drive gear 84A is transmitted through the two pairs of gears to the sprocket 100 and the chain 102.

Meanwhile, on a second power transmission path, the shift ring 105A is dog-connected to the second speed gear 94A (a second gear ratio), and the rotational power of the crankshaft 39 is inputted from the drive gear 84A through the crank gear 80. The rotational power is transmitted through the second speed gear 94A to the chain 102 of the counter shaft 78A. That is, on the second power transmission path, rotation of the drive gear 84A is transmitted to the sprocket 100 and the chain 102 without being transmitted through the pairs of gears.

The present invention is not limited to the embodiment described above, and various additions, modifications, or deletions may be made without departing from the gist of the invention. For example, in the embodiment described above, the input and output shafts 78, 82 of the supercharger transmission 99 shown in FIG. 4 and the input and output shafts 15, 19 of the driving reduction gear mechanism are supported by the common holder 43, but a holder for the input and output shafts of the supercharger transmission and a holder for the input and output shafts of the driving reduction gear mechanism may be formed as separate components. In addition, the supercharger mounting structure of the present invention is applicable to a saddle-type vehicle other than a motorcycle and also applicable to a three-wheel vehicle and a four-wheel vehicle. Furthermore, the supercharger mounting structure is applicable to a combustion engine other than a combustion engine mounted on a vehicle. Moreover, the front fork type motorcycle has been described in the above embodiment, but the present invention is not limited to this and is also applicable to, for example, a hub steering type motorcycle. Therefore, this is construed as included within the scope of the present invention.

REFERENCE NUMERALS

39 . . . crankshaft (engine rotary shaft)
40 . . . crankcase
42 . . . cylinder block
47 . . . intake port
62 . . . supercharger
64 . . . supercharger rotary shaft
68 . . . discharge port of supercharger
74 . . . intake air chamber
78 . . . counter shaft (idler shaft)
82 . . . supercharger drive shaft (rotary shaft of output gear)
84 . . . counter gear (idler gear)
86 . . . starter gear (another gear)
90 . . . starter motor (component meshing with the other gear)
96 . . . third speed gear (output gear)
98 . . . fourth speed gear (output gear)
99 . . . supercharger transmission
102 . . . chain (transmission body)
E . . . combustion engine

What is claimed is:

1. A supercharger-equipped combustion engine mounted on a vehicle, and comprising:
   a combustion engine, the combustion engine including:
   a crankcase supporting an engine rotary shaft;
   a cylinder block disposed above the crankcase;
   a supercharger having a rotation axis extending in a vehicle widthwise direction and configured to pressurize intake air and supply it to the combustion engine;
   an idler gear configured to transmit power of the engine rotary shaft to the supercharger;
   an idler shaft rotatably supporting the idler gear, the idler shaft being disposed rearward of the engine rotary shaft in a front-rear direction of the vehicle and extending parallel with the engine rotary shaft;
   a first gear disposed on the idler shaft so as to be aligned with the idler gear in the vehicle widthwise direction; and
   a second gear provided on the idler shaft and configured to transmit power of the engine rotary shaft to the supercharger, the second gear being disposed outward of the idler gear in the vehicle widthwise direction,
   wherein the supercharger is disposed above the crankcase and rearward of the cylinder block in the front-rear direction of the vehicle and driven by the power of the engine rotary shaft, the supercharger is disposed rearward of the idler shaft in the front-rear direction of the vehicle,
   a component meshing with the first gear is disposed forwardly of the supercharger in the front-rear direction of the vehicle, and
   the first gear is disposed inwardly of the second gear with respect to the vehicle widthwise direction.

2. The supercharger-equipped combustion engine as claimed in claim 1, wherein the first gear is disposed inward of the idler gear in the vehicle widthwise direction.

3. The supercharger-equipped combustion engine as claimed in claim 1, wherein the first gear is a balancer gear or a starter gear.

4. The supercharger-equipped combustion engine as claimed in claim 1, wherein the supercharger is disposed above a rear portion of the crankcase, and an intake air chamber is disposed between a discharge port of the supercharger and an intake port of the combustion engine in the front-rear direction of the vehicle.

5. The supercharger-equipped combustion engine as claimed in claim 1, wherein
the idler shaft is rotatably supported by the combustion engine, and
the idler gear is fitted to the counter shaft so as to be rotatable together with the idler shaft.

6. The supercharger-equipped combustion engine as claimed in claim 1, wherein the supercharger is composed of a centrifugal pump, and the second gear is disposed at one side which is the side opposite to a suction port of the supercharger in the vehicle widthwise direction.

7. The supercharger-equipped combustion engine as claimed in claim 1, further comprising:
a balancer shaft disposed above the idler shaft; and
a balancer gear provided on the balancer shaft and configured to mesh with the idler gear.

8. A supercharger-equipped combustion engine mounted on a vehicle, and comprising:
a combustion engine, the combustion engine including;
a crankcase supporting an engine rotary shaft;
a cylinder block disposed above the crankcase;
a supercharger having a rotation axis extending in a vehicle widthwise direction and configured to pressurize intake air and supply it to the combustion engine;
an idler gear configured to transmit power of the engine rotary shaft to the supercharger;
an idler shaft rotatably supporting the idler gear, the idler shaft being disposed rearward of the engine rotary shaft in a front-rear direction of the vehicle and extending parallel with the engine rotary shaft; and
a supercharger transmission configured to change a speed of rotation of the engine rotary shaft and transmit the power of the engine rotary shaft to the supercharger, wherein the supercharger is disposed above the crankcase and rearward of the cylinder block in the front-rear direction of the vehicle and driven by the power of the engine rotary shaft,
a first gear is disposed on the idler shaft so as to be aligned with the idler gear in the vehicle widthwise direction, the supercharger is disposed rearward of the idler shaft in the front-rear direction of the vehicle,
a component meshing with the first gear is disposed forwardly of the supercharger in the front-rear direction of the vehicle,
the supercharger transmission includes an output gear configured to change a speed of rotation of the idler gear and output the rotation,
a rotary shaft for the output gear of the supercharger transmission and the idler shaft extend parallel with the engine rotary shaft,
a rotary shaft of the supercharger and the rotary shaft for the output gear of the supercharger transmission are aligned in an up-down direction perpendicular to the vehicle widthwise direction, and
the supercharger-equipped combustion engine further comprises a transmission body configured to transmit power from the rotary shaft for the output gear of the supercharger transmission to the rotary shaft of the supercharger.

* * * * *